United States Patent [19]

Foissner et al.

[11] Patent Number: 4,579,317

[45] Date of Patent: Apr. 1, 1986

[54] ELECTRODE ARRANGEMENT FOR CAPACITIVE GUARD FENCES

[75] Inventors: Herbert Foissner, Wolfratshausen; Peter Kupec, Unterfoehring; Uwe Metzner; Peer Thilo, both of Munich, all of Fed. Rep. of Germany

[73] Assignee: Siemens Aktiengesellschaft, Berlin & Munich, Fed. Rep. of Germany

[21] Appl. No.: 459,233

[22] Filed: Jan. 19, 1983

[30] Foreign Application Priority Data

Feb. 18, 1982 [DE] Fed. Rep. of Germany ....... 3205837
Feb. 18, 1982 [DE] Fed. Rep. of Germany ... 8204566[U]
Feb. 18, 1982 [DE] Fed. Rep. of Germany ... 8204572[U]

[51] Int. Cl.[4] ................................ A01K 3/00
[52] U.S. Cl. ................................ 256/10; 174/133 R; 340/564
[58] Field of Search ................................ 256/10; 340/564; 174/133 R, 129 R

[56] References Cited

U.S. PATENT DOCUMENTS

| | | | |
|---|---|---|---|
| 277,374 | 5/1883 | Strohm | 174/111 |
| 2,314,798 | 3/1943 | Peterson | 174/128 R |
| 3,047,849 | 7/1962 | Hansen | 340/564 |
| 3,366,854 | 1/1968 | Robinson | 256/10 X |
| 3,504,892 | 4/1970 | Crist | 256/10 |
| 3,980,277 | 9/1976 | Enoksson | 256/10 |
| 4,028,489 | 6/1977 | Berg, Jr. et al. | 174/158 F X |
| 4,346,373 | 8/1982 | Hassman | 340/564 X |

FOREIGN PATENT DOCUMENTS

| | | | |
|---|---|---|---|
| 89031 | 5/1960 | Denmark | 256/10 |

*Primary Examiner*—Andrew V. Kundrat
*Attorney, Agent, or Firm*—Hill, Van Santen, Steadman & Simpson

[57] ABSTRACT

An electrode arrangement for capacitive guard fences wherein the conductor is horizontally stretched substantially parallel to the ground has a shape for preventing formation of water droplets which may collect as a result of precipitation from generating a false alarm and which also deters small animals from perching on the electrode. In one embodiment the electrode has a rectangular cross-section with the longest sides of the electrode being disposed substantially vertically. In another embodiment the electrode consists of two conductors having circular cross-sections which may be disposed parallel to one another or twisted. A further electrode embodiment has at least three conductors having very small circular cross-sections disposed at equal intervals from one another around a circular circumference. Means for facilitating water droplet runoff are provided at equal intervals which simultaneously serve as spacers for the conductors. Another electrode embodiment has a single line wire in the shape of a stretched helical spring.

6 Claims, 7 Drawing Figures

ELECTRODE ARRANGEMENT FOR CAPACITIVE GUARD FENCES

BACKGROUND OF THE INVENTION

1. Field of the Invention

The present invention relates to an electrode arrangement for capacitive guard fences, and in particular to an electrode arrangement wherein the electrode has at least one electrical line wire stretched substantially parallel to the ground, and wherein a plurality of such electrodes are disposed in proximity to one another.

2. Description of the Prior Art

Guard fences are frequently employed for protecting an object, in addition to building protection, for preventing unauthorized penetration to the object, or at least to impede such unauthorized penetration. In order to perceive unauthorized penetration, capacitive guard fences are utilized which trigger an alarm when a trespasser approaches the fence or attempts to penetrate it, thus altering the quiescent capacitance. Installations having a need for security, such as, for example, nuclear power stations, military installations, and certain manufacturing establishments, require extremely reliable terrain protection systems.

Conventional capacitive guard fences generally exhibit a plurality of electrodes consisting of longitudinally stretched wires which are secured to generally vertical poles or supports with insulators at specific intervals. The capacitances between the individual electrodes or the capacitances to ground are measured and evaluated by means of processing circuitry, and an alarm or disturbance criterian is derived therefrom. Because such outdoor systems are particularly susceptible to disruption due to environmental influences, for example, swelling wires due to precipitation or a bird or other small animal perching on the electrode, than are interior protection systems disposed in closed buildings, various measures are undertaken in order to avoid false alarms, so-called illusory alarms. Such measures are generally realized in terms of circuit technology. The designer attempts to reduce illusory alarms to a minimum by means of complicated measurement and evaluation methods given a sufficiently high response sensitivity of the capacitive guard fence. These measures are, however, subject to limitation because the changes in capacitance which are caused, for example, by raindrops or by birds perching on the electrodes cannot be completely suppressed with mensuration and evaluation techniques.

A bird perching on an electrode wire, which usually exhibits a circular cross-section, effects a change in capacitance which decreases a percentage of the normal capacitance as the diameter of the wire increases. Precipitation such as rain, which collects on conventional electrode wires in the form of drops suspended next to one another, also effects a change in capacitance which decreases as a percentage of the normal capacitance as the wire diameter increases. Thus the effect of the above capacitance-changing causes can be minimized by simply increasing the wire diameters of the electrode wires. Such a possible solution, however, has the significant disadvantage of requiring rather heavy wires which present mechanical support problems. Moreover, even larger birds and animals may then perch on such wires.

SUMMARY OF THE INVENTION

It is an object of the present invention to provide an electrode for a capacitive guard fence having a shape which simultaneously prevents formation of water droplets which significantly change the normal capacitance of the electrode and which simultaneously deters birds and other small animals from perching on the electrode.

A first embodiment of the electrode arrangement disclosed and claimed herein has a line wire disposed substantially horizontally to the ground having a rectangular conductor cross-section with its narrow sides being significantly smaller than its broad sides. The electrode is thus in the shape of a ribbon conductor. The narrow side of the conductor having a width, for example, of 0.1 mm (in comparison to a width for conventional conductors of 3 mm) makes it more difficult for birds and other small animals to alight thereon due to its cutting effect. The ribbon conductor is preferably disposed for use in a capacitive guard fence such that the narrow sides are vertically disposed, that is, such that the electrode is in the form of a ribbon placed vertically edgewise. Upon the occurrence of precipitation, water collects at the lateral surfaces of the conductor, that is, the wide sides of the ribbon conductor. A uniform formation of droplets at the lower edge (narrow side of the ribbon conductor) is substantially impossible. The lower flow resistance for the water at the large side faces (wide side of the ribbon conductor) enables a rapid transport of the water along the ribbon conductor. Any water film which may arise at the lower edge of the conductor is attracted to the lateral surface so that no drops can form at the lower edge of the electrode. The electromagnetic field is formed between two such electrodes disposed above one another, so that the field lines principally emerge from the conductors at the respective narrow sides thereof and at the edges of the ribbon conductor. The water situated at the wide sides of the ribbon conductor thus has substantially no disruptive influence on the capacitance of the guard fence.

Another embodiment of an electrode disclosed and claimed herein has at least two conductors having a circular cross section which are disposed closely adjacent one another in tight fitting relation. The two conductors may be disposed parallel to one another in the form of a double conductor which is disposed generally vertically so that the wires are above one another. During precipitation, water will collect in the gore of the double conductor so that droplet formation is prevented at the lower side of the electrode, as in the case of the above-described ribbon conductor.

The two conductors may also be twisted or stranded together with small wire pieces being inserted at specific intervals so that the electrode resembles barbed wire. This embodiment has the advantage that defined drip locations are periodically disposed along the length of the conductor which, during precipitation, effect a fast offrunning or dripping of the water film.

Another embodiment of the electrode has a plurality, for example, three, conductors which are disposed on the circumference of a circle having a selected radius. The line wires may be held at the desired interval relative to one another by means of a spacer disc consisting of insulating material along whose circumference the conductors are disposed in notches. Such an electrode is essentially a multiple conductor consisting of three very thin wires or conductors having the advantage that the wires have such a very small diameter so that birds and small animals can no longer perch thereon.

The multiple conductor embodiment also prevents water droplet formation during precipitation due to the thin wires comprising the multiple conductor which cause drops, which are very small, to form only on the lower edge of the conductor so as to cause no disruptive change in the capacitance. The multiple conductors function as an electrode having an effective radius which is smaller than the radius of the circle around which the conductors are disposed, but which is significantly larger than the radius of an individual conductor cross-section. The insulating disc simultaneously serves as a water runoff means as well.

Another embodiment of the invention disclosed and claimed herein is an electrode comprised of a line wire in the form of a longitudinally stretched helical spring. This embodiment exhibits lower-lying locations at specific intervals at which water droplets collect to form a larger drop and, as a result, drip off of the electrode. In comparison to a straight longitudinally stretched wire on which a very thin water film is formed during precipitation, resulting in the formation of small water drops at approximately uniform intervals, the helical electrode facilitates a faster formation of the droplets. In a conventional longitudinally stretched wire, the thin water film has a high flow resistance resulting in very slow dripping. Given a high wind, the droplets next to each other may be pushed together thereby forming a very large drop resulting in a capacitance discontinuity when the drop falls off of the wire, causing an illusory alarm. In the helical embodiment of the electrode disclosed and claimed herein, such disruptions cannot occur since the wind cannot force the drops uphill against the force of gravity. Only small drops at specific intervals are formed, these causing only a very slight capacitance change when they drip off of the electrode which can thus be taken into consideration when evaluating the capacitance change. The stretched helical spring exhibits an effective radius which is larger than the actual radius of the conductor or wire. This effective radius is the determining factor for the capacitance conditions at the guard fence.

The electrode in all of the above embodiments may be slightly inclined relative to the horizontal in order to achieve even faster dripping of the water collecting on the line wires. An electrode inclination of less than 5° suffices for this purpose.

Additionally, rather than disposing the electrodes precisely vertically above one another, the electrodes may be horizontally offset relative to one another. This has the advantage that water dripping from an uppermost electrode will not collect on the electrodes disposed therebelow thus further minimizing the possibility for an illusory alarm.

DESCRIPTION OF THE PREFERRED EMBODIMENTS

Figure 1:
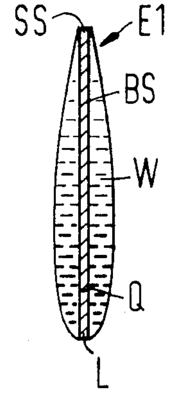
FIG. 1 is a sectional view of an electrode for a capacitive guard fence constructed in accordance with the principles of the present invention in a ribbon conductor embodiment.
Figure 2:
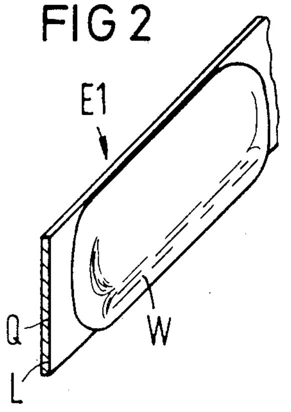
FIG. 2 is a perspective view of the electrode shown in FIG. 1.

A ribbon-shaped electrode E1 is shown in cross-section in FIG. 1 and in perspective view in FIG. 2. The shape of the electrode is such as to prevent formation of water droplets which may be a disruptive influence on the capacitance of a capacitive guard fence in which the electrode E1 is employed, and also functions to deter birds and other small animals from perching on the electrode. The cross-section Q of the electrode E1 is in the form of a rectangle having a narrow side SS which is small relative to the wide side BS. The narrow side may, for example, have a width of 0.1 mm and the wide side BS may have a width of, for example, 3 mm. The electrode E1 is disposed at the capacitive guard fence such that the narrow side SS is generally vertically disposed with respect to the ground.

During precipitation, a water film W is formed on the wide side BS of the electrode E1, that is, on the weak-field lateral face of the ribbon conductor placed on edge. The water film W has only a slight influence on the capacitance of the electrode because the electrical field predominantly exhibits its highest field strength at the edges and at the narrow side SS of the electrode E1. Water film which may arise on the narrow side SS of the ribbon conductor E1 is attracted to the lateral face BS because of the low flow resistance, so that no water drops, which change the capacitance of the guard fence, can form at the lower narrow side SS of the conductor. Such a ribbon conductor can retain a large amount of water at its wide sides BS because the water cross-section W may become relatively large. Given a slight inclination (less than 5°) a relatively fast water runoff is achieved when the amount of water at the lateral face of the conductor becomes too great. A slope of more than 10° would be required for this purpose for conventional round conductor wires.

Figure 3:
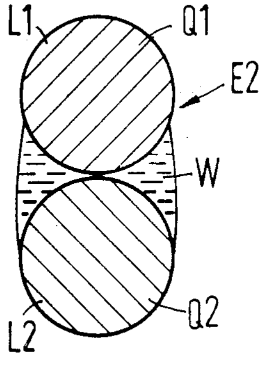
FIG. 3 is a sectional view of an electrode for a capacitive guard fence constructed in accordance with the principles of the present invention in an embodiment consisting of two circular-cross-section conductors.
Figure 4:
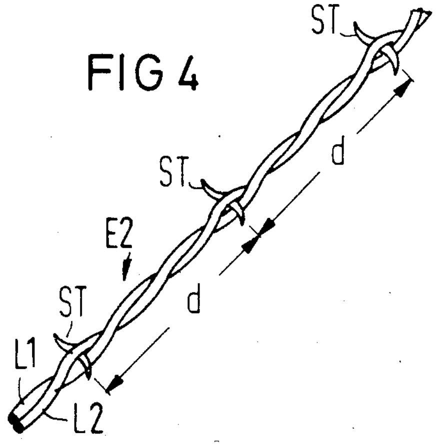
FIG. 4 is a perspective view of the conductor shown in FIG. 3.

A further embodiment of an electrode constructed in accordance with the principles of the present invention is shown in FIGS. 3 and 4. This electrode E2 has two conductors L1 and L2 packed tightly next to one another, having respective cross-sections Q1 and Q2. The conductors may be disposed parallel to one another or twisted relative to each other. During precipitation, water W may accumulate in the gore between the conductors L1 and L2. As viewed in section, a wedge of water W is formed. The water W exhibits behavior similar to that in the above-described ribbon conductor embodiment. The relatively large water cross-section W in the gore of the conductors L1 and L2 has a relatively low flow resistance along the conductor, so that water film which may form at the lower side of the electrode E2 is easily attracted. When the water in the conductor gore increases sufficiently, it drips off. Inclining the electrode by an amount less than 5° relative to the horizontal accelerates the dripping effect. As stated above, the two conductors L1 and L2 may be disposed parallel to each other, as described above in connection with the ribbon conductor, may be disposed at the capacitive guard fence generally vertically, so that conditions similar to those with the electrode E1 are achieved.

As shown in FIG. 4, the electrode E2 shown in FIG. 3 may be provided with small pieces of wire ST disposed at uniform intervals d along the longitudinal length of the electrode so that the conductor E2 resembles barbed wire. The pieces of wire ST provide defined drip locations for water and an inclination of the electrode E2 relative to the horizontal is not needed.

Figure 5:
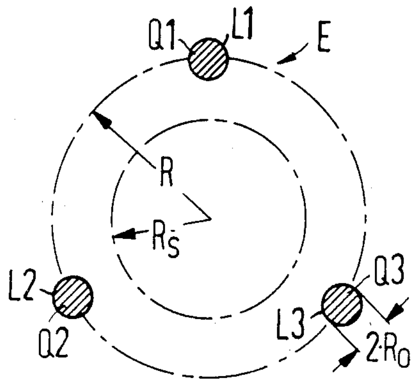
FIG. 5 is an electrode for a capacitive guard fence constructed in accordance with the principles of the present invention in a triple-conductor embodiment.

Another embodiment of an electrode constructed in accordance with the principles of the present invention is shown in FIG. 5 wherein the electrode E3 has a plurality of conductors, such as three thin individual conductors L1, L2 and L3 having respective circular cross-sections Q1, Q2 and Q3. Each individual conductor has a diameter of $2 \cdot R_o$. The three conductors L1, L2 and L3 are disposed parallel to one another at uniform intervals so that the cross-sections Q1, Q2 and Q3 of the three conductors as shown in FIG. 5 lie on a circular circumference having a radius R, thus forming an equilateral triangle. Although the radius $R_o$ of the individual conductors is very small, the electrode E has an effective radius $R_s$ having the following value:

$$R_s = R \cdot \sqrt[n]{(n \cdot R_o)/R}$$

wherein n is the number of conductors and R is the radius of the circle about which the conductors are disposed. The effective radius $R_s$ thus increases with the number of thin conductors ($n > 3$). The small radius $R_o$ of the conductors L1 through Ln of the electrode E prevents birds and other small animals from alighting thereon. Should a very small bird nonetheless alight on a wire of the electrode E, the change in capacitance caused thereby cannot be detected because, given the large effective radius $R_s$ of the electrode E, such a capacitance change is relatively small and does not result in an illusory alarm. The formation of drops during precipitation at the underside of the conductors L1 through L3 similarly does not cause a disruptive influence because such droplets form in a weak-field area of the electrode E due to the effective radius $R_s$ for the field of the capacitive guard fence, as explained above.

Figure 6:
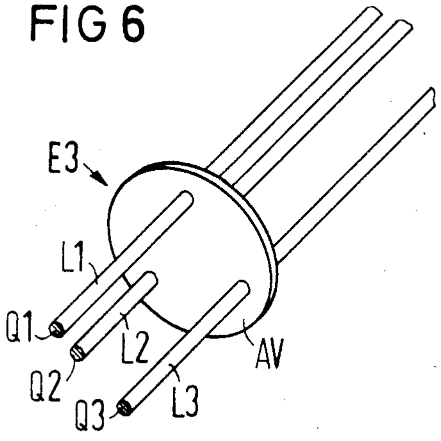
FIG. 6 is a perspective view of the electrode shown in FIG. 5.

An electrode E3 constructed in accordance with the schematic representations for the electrode E shown in FIG. 5 is illustrated in perspective view in FIG. 6, including a spacer disc AV which simultaneously serves as a water runoff or drip means. A plurality of such discs AV are disposed at regular intervals along the longitudinal length of the electrode E3.

Figure 7:
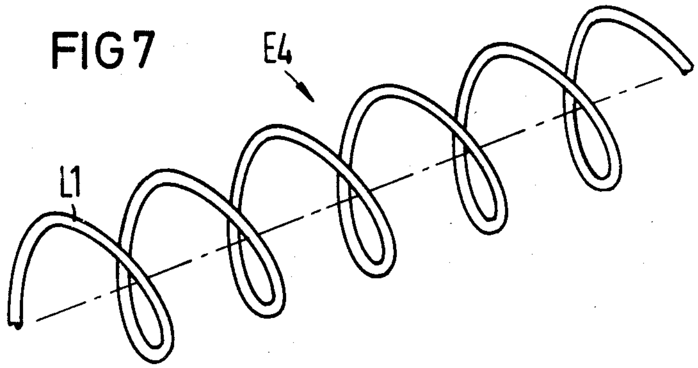
FIG. 7 is a perspective view of an electrode for a capacitive guard fence constructed in accordance with the principles of the present invention in a helical spring embodiment.

A further embodiment of an electrode constructed in accordance with the principles of the present invention is shown in FIG. 7 in the form of a helical spring electrode E4, comprised of a single conductor L1. As described above, during precipitation water will collect at the lowermost points of the helical spring electrode E4 in small drops, in contrast to a normal conventional straight wire conductor which may exhibit relatively large water droplets.

Each of the above embodiments may be provided with water runoff means in the form of rings or similar devices disposed along the length of the electrode at regular intervals.

Although modifications and changes may be suggested by those skilled in the art it is the intention of the inventors to embody within the patent warranted hereon all changes and modifications as reasonably and properly come within the scope of their contribution to the art.

We claim as our invention:

1. An electrode for a capacitive security fence consisting of two adjacent line wires each having a circular cross-section, said line wires being disposed parallel to and one above the other and being close enough to each other for holding water statically therebetween.

2. The electrode of claim 1 wherein said line wires are twisted with each other.

3. The electrode of claim 2 further comprising a plurality of short wire pieces inserted between the line wires at regular intervals along a longitudinal length of said electrode forming drip locations for water dispersal from said electrode.

4. An electrode for a capacitive security fence, wherein said electrode is inclined at an angle of 5° or less relative to the horizontal, consisting of two line wires each having a circular cross-section, said line wires being disposed adjacent to each other in direct contact and forming an electrode which is substantially parallel to the ground.

5. The electrode of claim 4 wherein said line wires are twisted with each other.

6. The electrode of claim 5 further comprising a plurality of short wire pieces inserted between the line wires at regular intervals along a longitudinal length of said electrode forming drip locations for water dispersal from said electrode.

* * * * *